United States Patent
Crawley et al.

(10) Patent No.: US 9,093,071 B2
(45) Date of Patent: *Jul. 28, 2015

(54) INTERLEAVING VOICE COMMANDS FOR ELECTRONIC MEETINGS

(71) Applicant: International Business Machines Corporation, Armonk, NY (US)

(72) Inventors: John A. Crawley, Carpenterstown (IE); Ruadhri J. Howman, Dun Laoghaire (IE); John O'Connor, Maynooth (IE); Mark E. Wallace, Blackrock (IE); Tracee L. Wolf, Ossining, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/030,423

(22) Filed: Sep. 18, 2013

(65) Prior Publication Data

US 2014/0142951 A1 May 22, 2014

Related U.S. Application Data

(63) Continuation of application No. 13/680,644, filed on Nov. 19, 2012.

(51) Int. Cl.
  *G10L 21/00* (2013.01)
  *G10L 15/22* (2006.01)
(52) U.S. Cl.
  CPC ..................... *G10L 15/22* (2013.01)

(58) Field of Classification Search
  USPC .............. 704/231, 233, 235, 270, 275, 270.1, 704/201; 348/14.08; 370/352
  See application file for complete search history.

(56) References Cited

U.S. PATENT DOCUMENTS

| | | | |
|---|---|---|---|
| 6,963,760 B2 | 11/2005 | Piwowarski | |
| 7,246,062 B2 | 7/2007 | Knott et al. | |
| 7,966,189 B2 | 6/2011 | Le et al. | |
| 8,165,886 B1 | 4/2012 | Gagnon et al. | |
| 2003/0078781 A1 | 4/2003 | Julia et al. | |
| 2003/0093281 A1* | 5/2003 | Geilhufe et al. | 704/275 |
| 2006/0023061 A1* | 2/2006 | Vaszary et al. | 348/14.08 |
| 2008/0180519 A1 | 7/2008 | Cok | |
| 2008/0181140 A1 | 7/2008 | Bangor et al. | |
| 2008/0232353 A1* | 9/2008 | Vafin et al. | 370/352 |
| 2010/0023876 A1 | 1/2010 | Shuf et al. | |
| 2010/0318357 A1 | 12/2010 | Istvan et al. | |
| 2011/0228923 A1 | 9/2011 | Pott et al. | |
| 2011/0288859 A1* | 11/2011 | Taylor et al. | 704/231 |
| 2012/0166184 A1* | 6/2012 | Locker et al. | 704/201 |

* cited by examiner

*Primary Examiner* — Huyen Vo
(74) *Attorney, Agent, or Firm* — Holland & Knight LLP; Brian J. Colandreo, Esq.; Jeffrey T. Placker, Esq.

(57) ABSTRACT

A method, computer program product, and system for identifying collaborators is described. A command precursor associated with delivery of a voice command associated with an electronic meeting is received. An audio signal including the voice command is received. A portion of the audio signal is identified as representing the voice command, based upon, at least in part, receiving the command precursor. The voice command is interpreted. The interpreted voice command is caused to be executed.

7 Claims, 4 Drawing Sheets

US 9,093,071 B2

INTERLEAVING VOICE COMMANDS FOR ELECTRONIC MEETINGS

RELATED APPLICATIONS

The subject application is a continuation application of U.S. patent application Ser. No. 13/680,644, filed on Nov. 19, 2012, the entire content of which is herein incorporated by reference.

TECHNICAL FIELD

This disclosure relates to using voice commands.

BACKGROUND

In various situations, individuals and/or groups may participate in electronic meetings. Electronic meetings may be interactions among individuals facilitated by electronic means. For example, communication applications may facilitate speech-, text-, and/or video-enabled communication sessions among a plurality of individuals. Certain electronic meetings may include presentation of audio-visual media to meeting participants in addition/as an alternative to speech, text, and/or video communication. For example, certain communication applications may permit meeting participants to view and/or control the presentation of various slides or other content. In the context of electronic communication, individuals may sometimes employ voice commands in order to activate and/or control various functionality.

BRIEF SUMMARY OF THE DISCLOSURE

According to one aspect of the disclosure, a computer-implemented method includes receiving, by one or more computing devices, a command precursor associated with delivery of a voice command associated with an electronic meeting. The method includes receiving, by the one or more computing devices, an audio signal including the voice command. The method includes identifying, by the one or more computing devices, a portion of the audio signal as representing the voice command based upon, at least in part, receiving the command precursor. The method includes interpreting, by the one or more computing devices, the voice command. The method includes causing, by the one or more computing devices, execution of the interpreted voice command.

One or more of the following features may be included. The method may include removing, by the one or more computing devices, audio information associated with the voice command from the audio signal before the audio signal is provided to one or more participants in the electronic meeting. The received command precursor may originate from a muted participant, wherein the participant is muted non-locally. The command precursor may be an audio signal. The command precursor may be a keypad input. The command precursor may be a customized precursor. Execution of the voice command may include translating a portion of the audio signal following the voice command into text. The audio signal including the voice command may originate at a mobile computing device.

According to another aspect of the disclosure, a computer program product resides on a computer readable storage medium and has a plurality of instructions stored on it. When executed by a processor, the instructions cause the processor to perform operations including receiving a command precursor associated with delivery of a voice command associated with an electronic meeting. The operations include receiving an audio signal including the voice command. The operations include identifying a portion of the audio signal as representing the voice command based upon, at least in part, receiving the command precursor. The operations include interpreting the voice command. The operations include causing execution of the interpreted voice command.

One or more of the following features may be included. The operations may include removing audio information associated with the voice command from the audio signal before the audio signal is provided to one or more participants in the electronic meeting. The received command precursor may originate from a muted participant, wherein the participant is muted non-locally. The command precursor may be an audio signal. The command precursor may be a keypad input. The command precursor may be a customized precursor. Execution of the voice command may include translating a portion of the audio signal following the voice command into text. The audio signal including the voice command may originate at a mobile computing device.

According to another aspect of the disclosure, a computing system includes one or more processors and one or more memory architectures coupled with the one or more processors. The one or more processors are configured to receive a command precursor associated with delivery of a voice command associated with an electronic meeting. The one or more processors are configured to receive an audio signal including the voice command. The one or more processors are configured to identify a portion of the audio signal as representing the voice command based upon, at least in part, receiving the command precursor. The one or more processors are configured to interpret the voice command. The one or more processors are configured to cause execution of the interpreted voice command.

One or more of the following features may be included. The one or more processors may be configured to remove audio information associated with the voice command from the audio signal before the audio signal is provided to one or more participants in the electronic meeting. The received command precursor may originate from a muted participant, wherein the participant is muted non-locally. The command precursor may be an audio signal. The command precursor may be a keypad input. The command precursor may be a customized precursor. Execution of the voice command may include translating a portion of the audio signal following the voice command into text. The audio signal including the voice command may originate at a mobile computing device.

According to one aspect of the disclosure, a computer-implemented method includes receiving, by one or more computing devices, a command precursor associated with delivery of a voice command associated with an electronic meeting, wherein the command precursor is a customized audio signal. The method includes receiving, by the one or more computing devices, an audio signal including the voice command. The method includes identifying, by the one or more computing devices, a portion of the audio signal as representing the voice command based upon, at least in part, receiving the command precursor. The method includes interpreting, by the one or more computing devices, the voice command. The method includes causing, by the one or more computing devices, execution of the interpreted voice command. The method includes removing, by the one or more computing devices, audio information associated with the voice command from the audio signal before the audio signal is provided to one or more participants in the electronic meeting.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

Like reference symbols in the various drawings indicate like elements.

DETAILED DESCRIPTION OF THE PREFERRED EMBODIMENTS

Figure 1:
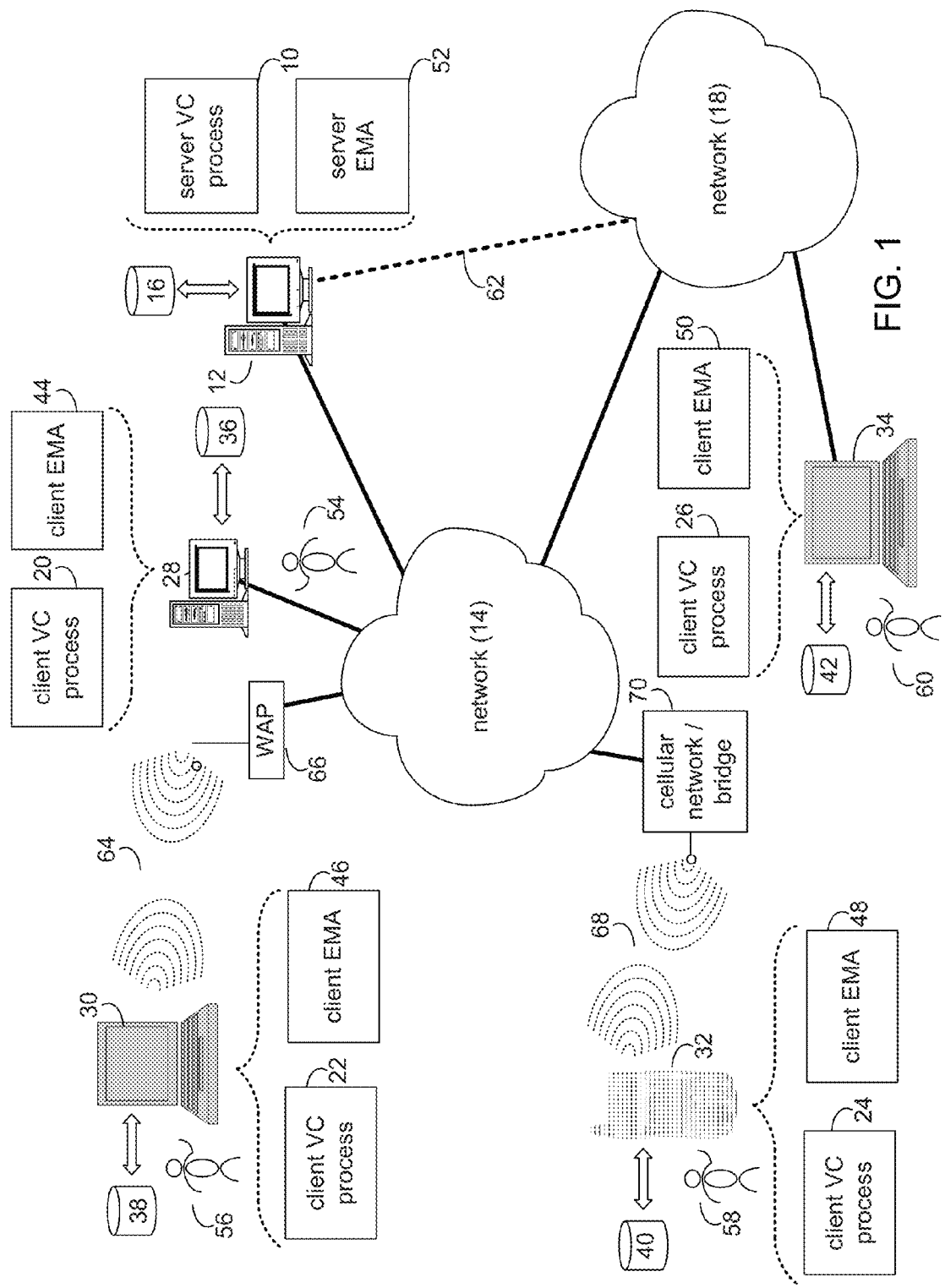
FIG. 1 is a diagrammatic view of a voice command process coupled to a distributed computing network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

In various personal, professional, and other settings, individuals and groups of individuals may find it useful to communicate electronically (i.e., to participate in an electronic meeting). For example, individuals may participate in conference calls, online meetings, and so on. In certain embodiments, individuals may participate in video-enabled communication sessions in which they may view one or more of the other participants and/or other content via a video display. In certain embodiments, participants in electronic meetings may view and/or control the presentation of slides and/or other electronic content. In certain embodiments, voice data from participants in an electronic meeting may be converted to text content (e.g., using various known voice-to-text processes).

It may be useful, as part of an electronic meeting, for participants to have the option to control aspects of the meeting using voice commands. For example, it may be useful for a participant to be able to use voice commands to mute or un-mute his connection, control presentation of multimedia materials (e.g., electronic slides, video, audio segments, and so on), control transcription of voice data into text content, and so on. Voice commands may be interpreted and implemented using various known techniques such as, for example, Interactive Voice Response ("IVR"). It may be difficult and/or resource intensive, however, to distinguish a voice command from non-command audio and/or other content that is associated with the command. A voice command ("VC") process may, for example, address these and other issues by facilitating recognition and execution of voice commands based on identifying various command precursors and/or executing various other functionality.

Referring now to FIG. 1, a VC process may be coupled to a computer or computer network. For example, server VC process 10 may reside on and may be executed by server computer 12, which may be connected to network 14 (e.g., the Internet or a local area network). Examples of server computer 12 may include, but are not limited to: a personal computer, a server computer, a series of server computers, a mini computer, and/or a mainframe computer. Server computer 12 may be a web server (or a series of servers) running a network operating system, examples of which may include but are not limited to: Microsoft® Windows Server® Novell® Netware®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

The instruction sets and subroutines of server VC process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft® IIS, Novell® Web Server™, or Apache® Web Server, that allows for access to server computer 12 (via network 14) using one or more protocols, examples of which may include but are not limited to HTTP (i.e., HyperText Transfer Protocol), SIP (i.e., session initiation protocol), and the Lotus® Sametime® VP protocol. (Webserver is a trademark of Novell Corporation in the United States, other countries, or both; Apache is a registered trademarks of Apache Software Foundation in the United States, other countries, or both; Lotus and Sametime are registered trademarks of International Business Machine Corp. in the United States, other countries, or both.) Network 14 may be connected to one or more secondary networks (e.g., network 18), examples of which may include but are not limited to: a local area network; a wide area network; or an intranet, for example.

Client VC processes 20, 22, 24, 26 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 14 and/or network 18 and may each execute an operating system, examples of which may include but are not limited to Microsoft® Windows®, Microsoft Windows CE®, Red Hat® Linux®, or a custom operating system.

The instruction sets and subroutines of client VC processes 20, 22, 24, 26, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

In an embodiment, the VC process may be a server-side process (e.g., which may be implemented via server VC process 10), in which all of the functionality of the VC process may be executed on a server computer (e.g., server computer 12). In an embodiment, the VC process may be a client-side process (e.g., which may be implemented via one or more of client VC processes 20, 22, 24, 26), in which all of the functionality of the VC process may be executed on a client computing device (e.g., one or more of client electronic devices 28, 30, 32, 34). In an embodiment, the VC process may be a hybrid server-client process (e.g., which may be implemented by server VC process 10 and one or more of client VC processes 20, 22, 24, 26), in which at least a portion of the functionality of the VC process may be implemented via server computer 12 and at least a portion of the functionality of the VC process may be implemented via one or more client computing devices (e.g., one or more of client electronic devices 28, 30, 32, 34).

In certain embodiments, a VC process may be a stand-alone process. In certain embodiments, a VC process may operate as part of, or in conjunction with, one or more other processes and/or may include one or more other processes. For example, in certain embodiments, a VC process may be included in (or may operate in conjunction with) an application for conferencing, communication, or other types of collaboration. For example, a VC process may be included in a product such as an electronic meeting application.

An electronic meeting application ("EMA") (or process) may operate (and/or reside) on a client device (e.g., client EMA 44, operating on client electronic device 28; client EMA 46, operating on client electronic device 30; client EMA 48, operating on client electronic device 32; or client EMA 50, operating on client electronic device 34). A client VC process (e.g., client VC process 20) or a server VC process (e.g., server VC process 10) may be in communication with a client EMA (e.g., client EMA 44) or may be part of a client EMA.

An EMA may additionally or alternatively operate (and/or reside) on a server device (e.g., server EMA 52, operating on server computer 12 or another server EMA (not shown), operating on another server computer (not shown)). A server VC process (e.g., server VC process 10) or a client VC process (e.g., client VC process 20) may be in communication with a server EMA (e.g., server EMA 52) or may be a part of a server EMA.

An EMA (or process) may be an application (or process) that facilitates electronic meetings. In certain embodiments, an EMA may include or may interact with a media control unit ("MCU") (not shown). An MCU may, for example, receive audio and other information associated with participants in an electronic meeting, may mix and/or otherwise process the information (e.g., adjust levels, apply non-local muting, and so on), and may provide a stream of audio and/or other information to the participants in the meeting. In certain embodiments, an MCU may receive dual tone multi-frequency ("DTMF") signals, which may facilitate an MCU providing various additional functionality (e.g., controlling meeting attendance, applying non-local muting, and so on).

Users 54, 56, 58, 60 may access a VC process in various ways. For example, these users may access server VC process 10 directly through the device on which a client process (e.g., client VC processes 20, 22, 24, 26) is executed, namely client electronic devices 28, 30, 32, 34. Users 54, 56, 58, 60 may access server VC process 10 directly through network 14 and/or through secondary network 18. Further, server computer 12 (i.e., the computer that executes server VC process 10) may be connected to network 14 through secondary network 18, as illustrated with phantom link line 62. Users 54, 56, 58, 60 may also access a client or server EMA in similar ways.

The various client electronic devices may be directly or indirectly coupled to network 14 (or network 18). For example, personal computer 28 is shown directly coupled to network 14 via a hardwired network connection. Further, notebook computer 34 is shown directly coupled to secondary network 18 via a hardwired network connection. Laptop computer 30 is shown wirelessly coupled to network 14 via a wireless communication channel 64 established between laptop computer 30 and wireless access point ("WAP") 66, which is shown directly coupled to network 14. WAP 66 may be, for example, an IEEE 802.11a, 802.11b, 802.11g, 802.11n, Wi-Fi, and/or Bluetooth device that is capable of establishing wireless communication channel 64 between laptop computer 30 and WAP 66. Data-enabled mobile telephone 32 is shown wirelessly coupled to network 14 via wireless communication channel 68 established between data-enabled mobile telephone 32 and cellular network/bridge 70, which is shown directly coupled to network 14.

As noted above, in certain embodiments a VC process may be part of and/or may interact with one or more EMAs (e.g., server EMA 52, client EMA 44, and so on). In certain embodiments VC process may be part of and/or may interact with one or more MCUs (not shown). Further, as noted above, in certain embodiments an EMA may include and/or may interoperate with an MCU and vice versa. As such, for example, in certain embodiments, a VC process may receive notification of relevant streams of content from an MCU, may be part of an MCU, and/or may act as a proxy, receiving and processing streams of content before directing the streams (e.g., as altered by the VC process) to the MCU (and/or other system components). In this way, for example, a VC process may be implemented, in certain embodiments, without the need for specialized hardware associated with a particular computing device or network connection.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

For the following discussion, client VC process 20 will be described for illustrative purposes. It will be understood that client VC process 20 may, for example, interact and/or communicate with a server VC process such as server VC process 10 and/or may be executed within one or more applications that allow for communication with other server and/or client VC processes. This is not intended to be a limitation of this disclosure, as other configurations are possible (e.g., VC process 20 may include stand-alone client processes and/or stand-alone server processes) For example, some implementations may include one or more of client VC processes 22, 24, 26 or server VC process 10 in place of or in addition to client VC process 20.

Figure 2:
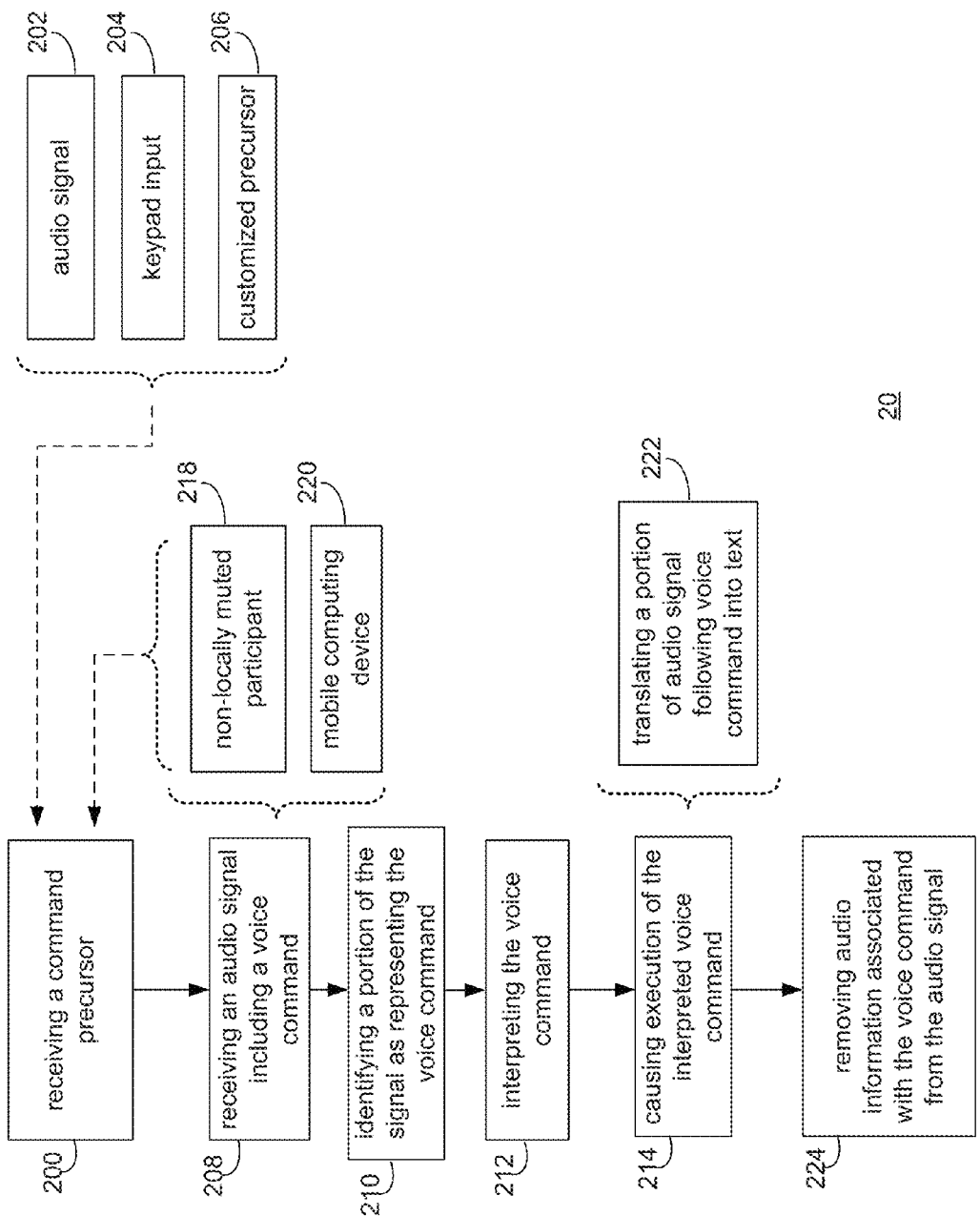
FIG. 2 is a flowchart of a process executed by the voice command process of FIG. 1.

Referring now also to FIG. 2, there is shown a diagrammatic view of an example process that may be implemented by a VC process, e.g., client VC process 20. Client VC process 20 may receive 200 a command precursor associated with delivery of a voice command associated with an electronic meeting. A command precursor may be a portion of a signal received by VC process 20 that indicates that a voice command may be included in the signal after the command precursor. By receiving 200 a command precursor, therefore, VC process 20 may determine, despite various levels of background noise, various intonations and cadences associated with participants, various call configurations and so on, that a portion of the audio signal (or audio portion of a multi-media signal) that follows the command precursor may represent a voice command.

When participating in an electronic meeting, participants (and/or other individuals, applications or processes) may provide various types of command precursors to be received 200 by VC process 20. In certain embodiments, for example, a command precursor may be audio signal 202. For example, a particular word, phrase, sound, tone, and so on, may indicate that the spoken words that will follow that word, phrase, sound, tone, and so on, may represent a voice command. For example, in certain embodiments, the spoken word "Command" may indicate that the word (or phrase) that follows the word "Command" may represent a voice command. In certain embodiments, other types of audio signals may similarly be received 200 as command precursors. For example, a series of clicks, taps, whistles, hums, and so on may, individually or collectively, be received 200 as command precursors.

In certain embodiments, the received 200 command precursor may be keypad input 204. For example, using a telephone keypad a participant may provide a DTMF signal to VC process 20 as a command precursor. For example, an individual may press the hash ("#") button on her telephone console (or other button or combination of buttons) in order to transmit the corresponding DTMF signal to VC process 20 as a command precursor and thereby indicate that the audio signal following the hash button signal may include a voice command.

In certain embodiments, the received 200 command precursor may include non-audio information. For example, in certain embodiments, selection of an icon on a touch-screen device, clicking an icon with a mouse or other input device, executing a gesture, and so on may cause a command precursor signal to be sent.

In certain embodiments, the received 200 command precursor may be a customized precursor 206. For example, in certain embodiments, VC process 20 may recognize default command precursors. For example, as above, a default command precursor may include a DTMF signal associated with the hash button on a telephone, or may include the word "Command." In certain embodiments, it may additionally/alternatively be useful for a user (and/or administrator) to set customized precursors 206. For example, if a user tends to say "command" frequently in conversation, the user may not wish to use the word "Command" as a command precursor. In such a case, for example, the user may designate customized precursor 206 to replace (or supplement) the default (or other)

command precursor. For example, in certain embodiments, a user may select a name, a musical tune, a combination of keypad inputs 204, a particular gesture or movement, and so on to serve as customized command precursor 206.

In certain embodiments, a command precursor may be implicit to an action associated with an electronic meeting. In certain embodiments, VC process 20 may recognize an implicit action as a command precursor based on contextual analysis. For example, if a participant is muted or has otherwise been silent, the participant starting to talk may implicitly represent a command precursor and may be received 200 as such by VC process 20. In certain embodiments, a gesture, keypad input, or other action may similarly include a command precursor.

VC process 20 may receive 208 an audio signal including the voice command. In certain embodiments, the received 208 audio signal may include the received 200 command precursor. For example, a participant may provide a command precursor (e.g., may say "Command" or press the hash button to generate a DTMF signal), which may be received 200 by VC process 20 as part of receiving 208 a larger audio signal including the command precursor and a subsequent command. For example, continuing the above example, the participant may say "Command. Go to slide 27." In certain embodiments, these two phrases may be included in a single audio signal, in which case receiving 208 the audio signal may include receiving 200 the command precursor. In certain embodiments, VC process 20 may receive 208 an audio signal including the voice command associated with the command precursor after (and/or separately from) receiving 200 a command precursor. For example, VC process 20 may receive 200 a touch-screen input including a command precursor and may subsequently receive 208 an audio signal including a command associated with the precursor.

VC process 20 may identify 210 a portion of the received 208 audio signal that as representing the voice command. For example, because it has been alerted, by virtue of receiving 200 a command precursor, that a voice command is expected, VC process 20 may analyze a received 208 audio signal in order to identify a recognized (or recognizable) voice command. In this way, for example, VC process 20 may facilitate efficient use of processing and other resources by analyze audio signals for voice commands only as needed. For example, VC process 20 may facilitate using such resources only when a voice command is expected (i.e., only after a command precursor is received 200). In certain embodiments, in order to identify 210 a portion of an audio signal that represents a voice command VC process 20 may, for example, analyze a fixed amount of voice data received 208 immediately after a command precursor, analyze voice data representing a certain amount of time following the command precursor, may analyze all audio signals received 208 after receiving 200 a command precursor until a voice command is identified. As noted above, VC process 20 may analyze received 208 audio signals to identify voice commands using a variety of known techniques (e.g., using IVR).

VC process 20 may interpret 212 the voice command included in the identified 210 portion of the audio signal. For example, using interactive voice response ("IVR") or other known techniques, VC process 20 may translate (alone or in combination with one or more other processes) a received 208 and identified 210 voice command into a directive to execute an appropriate action. For example, continuing the example above, a participant may say "Command. Go to slide 27." VC process 20 may accordingly receive 200 the command precursor "Command," may identify 210 that the remainder of the audio signal includes the voice command "Go to slide 27," and may interpret 212 that voice command to indicate that the individual desires that a presentation associated with the current electronic meeting be advanced to slide 27.

It will be understood that an interpreted 212 voice command may be associated with a variety of functionality for an electronic meeting. For example, a voice command may indicate that a participant should be muted or un-muted, that a presentation should advance to a different slide, that a multimedia file should start or stop playing, that a participant desires to raise his hand for a comment or question, that a participants or moderator would like to flag a piece of content for follow-up, that a participant or moderator would like to activate transcription of a portion of the meeting, and so on. VC process 20 may identify functionality associated with a voice command using a variety of known techniques including IVR, contextual and/or syntactical analysis, voice recognition technology, and so on.

VC process 20 may cause 214 execution of the interpreted voice command. For example, continuing the example above, VC process 20 may cause the presentation to be advanced to slide 27 based on receiving 200, 208 an audio signal including "Command. Go to slide 27." In certain embodiments, VC process 20 may directly cause execution of an interpreted voice command. In certain embodiments, VC process 20 may cause 214 execution of an interpreted voice command indirectly. For example, in certain embodiments, VC process 20 may cause an identified 210 and/or interpreted 212 voice command to be transmitted to an MCU, EMA or other application or process for execution.

In certain embodiments, VC process 20 may receive 200 a command precursor (and/or receive 208 an audio signal) from a non-locally muted participant 216. In certain embodiments, it may be useful for a participant in an electronic meeting to mute his connection so that conversations, typing, and other noises occurring near the muted participant do not distract the other participants in the meeting. In certain embodiments, such muting may occur non-locally. For example, in an electronic call facilitated by an MCU, a participant may choose to mute his line using the functionality of the MCU. In such a case, audio signals may be transmitted from the participant's electronic device (e.g., an office phone, cell phone, computer, and so on) to the MCU but may not be transmitted from the MCU to the remainder of the participants (i.e., because the participant is non-locally muted).

VC process 20 may utilize the fact that audio signals from non-locally muted participants 216 are transmitted to an MCU (and/or other device or process) in order to receive 200 command precursors (including, for example, audio signals 202) from such participants 216. For example, a participant that is non-locally muted may desire to un-mute his line in order to speak to the group. As a result, he may speak into his (non-locally muted) line the phrase "Command. Un-mute me." Although other participants in the call may not hear this phrase (i.e., because the speaking participant is non-locally muted), VC process 20 may still receive 200 the command precursor, "Command," and may accordingly receive 208, identify 210, interpret 212 and cause 214 to be executed the voice command "Un-mute me."

In certain embodiments, the received 208 audio signal may originate from mobile computing device 220. This may be useful, for example, where individuals using mobile computing devices would like to control various aspects of an electronic meeting, but are not able to do so in traditional ways because of limitations inherent to the mobile computing devices (e.g., processing power, screen size, keypad size and content, and so on). For example, in certain electronic meetings, various actions (e.g., comment on a slide, advance a slide, non-locally mute/un-mute the line, and so on) may be available as action icons on a display associated with the meeting. Whereas participants using laptop and desktop computers with large displays may be able to easily see and activate such action icons, participants using smaller display devices (e.g., cell phones and/or tablets) may not be able to easily see and activate such icons. As such, it may be useful for a participant using mobile computing device 220 to provide voice commands associated with the meeting via VC process 20. For example, instead of using an action icon associated with a particular command (which may be difficult to see/use on a mobile computing device), a participant using mobile computing device 220 may provide a command precursor and voice command, which may be received 200, 208, identified 210, interpreted 212 and caused 214 to be executed, by VC process 20. In this way, for example, it may be possible for a participant using mobile computing device 220 to control a meeting including a multimedia presentation even though the participant may not be able to see (or otherwise fully experience) that presentation.

In certain embodiments, causing 214 the execution of the interpreted voice command may including translating 222 a portion of the audio signal associated with the voice command into text. As also noted above, certain electronic meetings may include text-based communication as well as, for example, audio- and/or video-communication. For example, in certain embodiments, users may be free to comment on a meeting presentation, while the presentation is ongoing, by using text-based communication. Similarly, in certain embodiments, an EMA (or other application or process) may facilitate preparation of a transcript of a portion of a meeting (e.g., the minutes of a meeting) for later review. Accordingly, it may be useful, in certain embodiments, to translate, using known voice-to-text techniques, a portion of an audio (and/or video) stream into text. As such, for example, VC process 20 may interpret 212 a voice command that, when caused 214 to be executed, translates a portion of an audio signal into text.

In certain embodiments, VC process 20 may remove 224 audio information associated with the voice command from the received 208 audio signal. In certain embodiments, a received 200 command precursor and/or a identified 210 voice command may not contain information that is explicitly relevant to other participants in an electronic meeting (other than indicating, for example, a command, the execution of which may be relevant to those participants). For example, continuing the example above, non-locally muted participant 218 may, in order to un-mute his line, say "Command. Un-mute me." As described above, VC process 20 may receive 200 the command precursor "Command," may receive 208 the audio signal "Un-mute me," may identify 210 that the received 208 audio signal includes only the command phrase "Un-mute me," may interpret 212 the voice command as a command to non-locally un-mute the participant's line, and may cause 214 the participant's line to be non-locally un-muted. In certain embodiments, in order to avoid distracting other participants with this audio stream—which may contain, for example, only a command precursor and/or a command—VC process may remove 224 the audio information associated with the voice command (e.g., the voice command, the voice command precursor, or both) from the received 208 audio stream before the audio stream is transmitted to the other participants. Continuing the example above, because VC process 20 may remove 224 from the received 208 signal audio information associated with the command and command precursor, other participants may not hear the phrase "Command. Un-mute me," but may hear only the portions of the audio signal that follow the identified 210 command (i.e., audio following the phrase "Un-mute me"). In certain embodiments, removing 224 audio information from electronic meeting signals may be facilitated by lag time associated with the receipt, processing and transmission of audio (and other) signals by an MCU (and/or other device or application). For example, if VC process 20 removes 224 audio information during the lag time, participants may perceive no gap in the transmitted audio even though certain audio information has been removed 224 by VC process 20.

Figure 3:
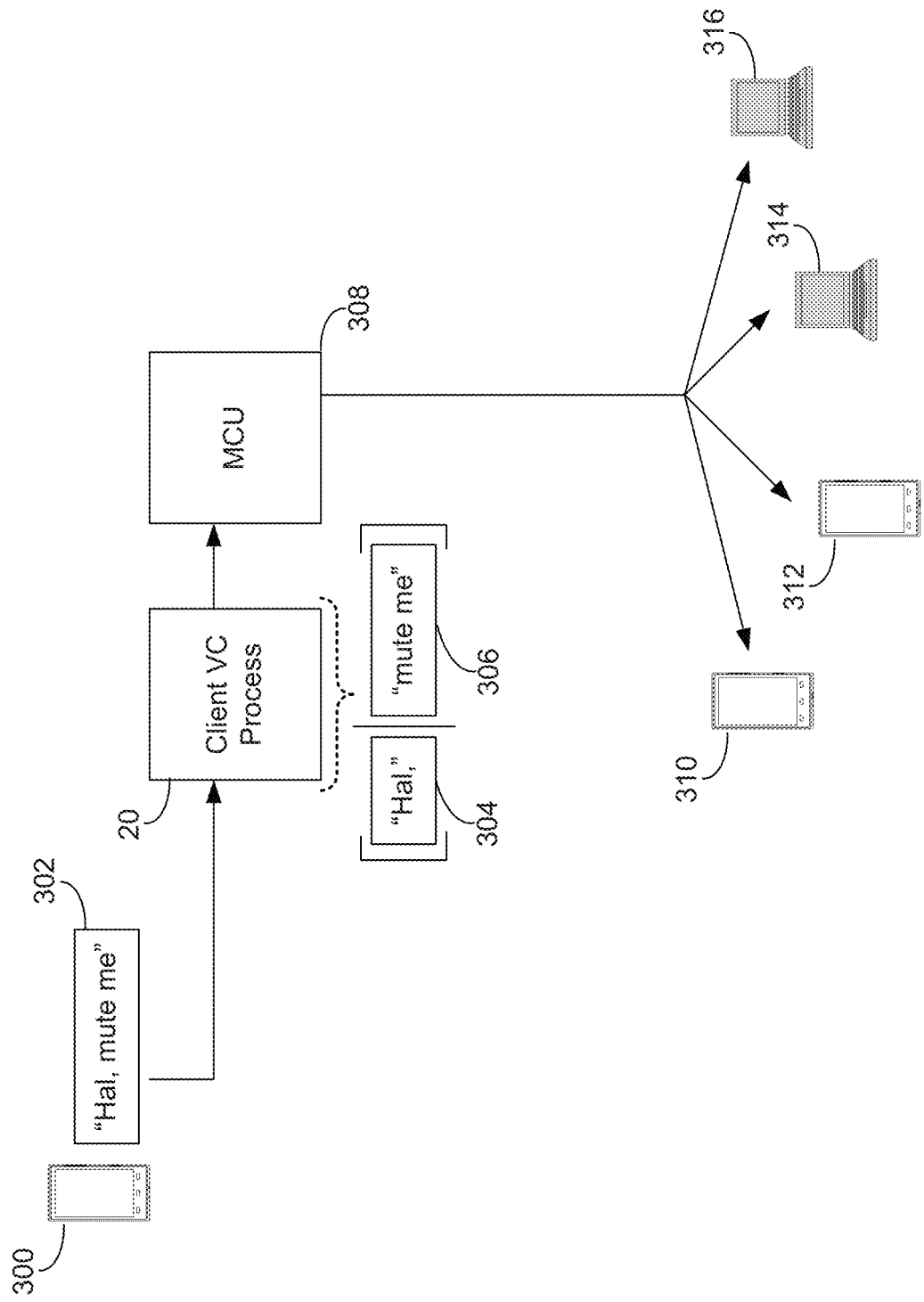
FIG. 3 is a diagrammatic view of an implementation of the voice command process of FIG. 1.

Referring now also to FIG. 3, a diagrammatic view of an implementation of VC process 20 is presented. For example, using mobile device 300, a participant may provide audio signal 302, including the phrase "Hal, mute me." VC process 20 may recognize that "Hal" is a customized command precursor 206 and, as such, may receive 200 command precursor "Hal" as part of receiving 208 audio stream 302. VC process 20 may identify 210, based upon, for example, IVR analysis, that portion 304 of stream 312 represents a customized command precursor (i.e., "Hal,") and that portion 306 of stream 312 represents a voice command (i.e., "mute me"). As such, for example, based on interpreting 212 the voice command, VC process 20 may indicate to MCU 308 that mobile device 300 should be non-locally muted. Additionally, VC Process 20 may remove 224 audio information associated with signal 302 (i.e., audio information associated with voice command portion 306 and voice command precursor portion 304) so that the phrase "Hal, mute me," is not heard by participants using devices 310, 312, 314, and 316.

Figure 4:
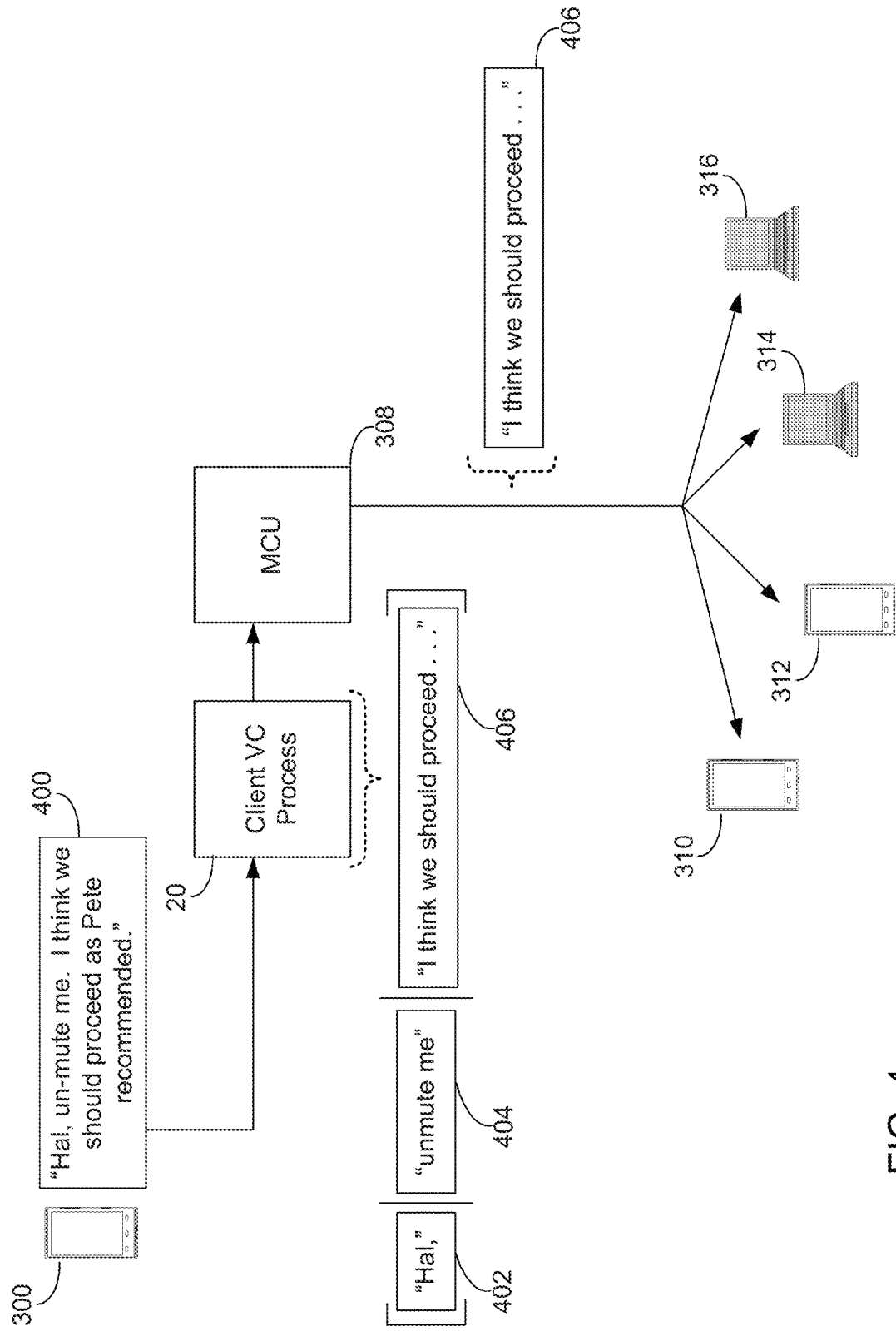
FIG. 4 is a diagrammatic view of an implementation of the voice command process of FIG. 1.

Referring now also to FIG. 4, a diagrammatic view of an implementation of VC process 20 is presented. Continuing the example above, using mobile device 300, a non-locally muted participant may provide audio signal 400, including the phrase "Hal, un-mute me. I think we should proceed as Pete recommended." VC process 20 may recognize, as above, that "Hal" is a customize command precursor 206 and, as such, may receive 200 command precursor "Hal" as part of receiving 208 audio stream 400. VC process 20 may identify 210, based upon, for example, IVR analysis, that portion 402 of stream 402 represents a customized command precursor (i.e., "Hal,") and that portion 404 of stream 402 represents a voice command (i.e., "un-mute me"). VC process 20 may further determine that portion 406 of stream 402 represents audio that should be heard by other participants in the call (i.e., audio that is not a command precursor and/or voice command). As such, for example, VC process 20 may indicate to MCU 308 that mobile device 300 should be non-locally un-muted. Additionally, VC Process 20 may remove 224 audio information associated with signal 400 (i.e., audio information associated with voice command portion 404 and voice command precursor portion 402) so that the phrase "Hal, un-mute me," is not heard by participants using devices 310, 312, 314, and 316, but the phrase "I think we should proceed . . . " is heard by the participants.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of embodiments and implementations have been described. Nevertheless, it will be understood that various modifications may be made. Accordingly, other embodiments and implementations are within the scope of the following claims.

What is claimed is:

1. A computer-implemented method comprising:
   receiving, by one or more computing devices, a command precursor associated with delivery of a voice command associated with an electronic meeting;
   analyzing, by the one or more computing devices, a fixed amount of voice data received immediately after the command precursor to identify whether the voice data represents the voice command;
   receiving, by the one or more computing devices, an audio signal including the voice command;
   identifying, by the one or more computing devices, a portion of the audio signal as representing the voice command based upon, at least in part, receiving the command precursor;
   interpreting, by the one or more computing devices, the voice command;
   causing, by the one or more computing devices, execution of the interpreted voice command, including translating a portion of the audio signal following the voice command into text; and
   removing audio information associated with the voice command from the audio signal before the audio signal is translated into text to be provided to one or more participants in the electronic meeting.

2. The computer-implemented method of claim 1 wherein the received command precursor originates from a muted participant, wherein the participant is muted non-locally.

3. The computer-implemented method of claim 1 wherein the command precursor is an audio signal.

4. The computer-implemented method of claim 1 wherein the command precursor is a keypad input.

5. The computer-implemented method of claim 1 wherein the command precursor is a customized precursor.

6. The computer-implemented method of claim 1 wherein the audio signal including the voice command originates at a mobile computing device.

7. A computer-implemented method comprising:
   receiving, by one or more computing devices, a command precursor associated with delivery of a voice command associated with an electronic meeting, wherein the command precursor is a customized audio signal;
   analyzing, by the one or more computing devices, a fixed amount of voice data received immediately after the command precursor to identify whether the voice data represents the voice command;
   receiving, by the one or more computing devices, an audio signal including the voice command;
   identifying, by the one or more computing devices, a portion of the audio signal as representing the voice command based upon, at least in part, receiving the command precursor;
   interpreting, by the one or more computing devices, the voice command;
   causing, by the one or more computing devices, execution of the interpreted voice command, including translating a portion of the audio signal following the voice command into text; and
   removing, by the one or more computing devices, audio information associated with the voice command from the audio signal before the audio signal is translated into text to be provided to one or more participants in the electronic meeting.

* * * * *